Patented Jan. 19, 1932

1,842,085

UNITED STATES PATENT OFFICE

MATTHEW GREEN AND ELMER M. JONES, OF DETROIT, MICHIGAN, ASSIGNORS TO PARKER RUST-PROOF COMPANY, OF DETROIT, MICHIGAN, A CORPORATION OF MICHIGAN

RUST PROOFING COMPOSITION AND METHOD OF MAKING THE SAME

No Drawing. Application filed October 24, 1925. Serial No. 64,569.

Our invention relates to the art of rust-proofing iron by coating articles composed of, or containing, iron with a layer of insoluble phosphates of iron and manganese.

Iron forms a series of phosphates, ranging from high acid salts to basic salts. The high acid salts are soluble in water, whereas the low acid and basic salts are substantially insoluble.

It is well known that iron can be rust-proofed by forming on its surface a coating of insoluble low acid or basic phosphates of iron. This has been done extensively by immersing iron articles in a dilute heated solution of phosphoric acid containing a certain amount of phosphates of iron, of manganese, or of both. The coating appears to be formed only when there is a series of phosphates present, constituting what is commonly known as a "balanced" solution. This solution has been prepared in various ways. Our invention relates to novel materials for forming the solution, and a process for forming the materials and method of using the materials.

Our preferred material is a powdered or granular substance containing a large proportion of high acid phosphates of iron and manganese with a sufficient quantity of lower acid phosphates so that, when the material is mixed with the proper proportion of water, a substantially balanced solution is formed. Coating begins immediately upon immersing iron articles in such a solution.

In forming this material, we first mix the ordinary commercial, approximately 65%, solution of phosphoric acid with iron filings or other iron fragments. While it is not necessary, it is highly desirable to heat the acid to about 100° C. before allowing it to re-act with the iron. The mixture is stirred vigorously while the acid is slowly added, so as to constantly bring the fresh acid into direct contact with iron. When strong phosphoric acid contacts iron, high acid salts are formed. Weaker acid, or the acid salts in contact with iron, form the lower acid and insoluble salts. By forming the mixture in the manner stated, a maximum of high acid salt is formed with a minimum of the low acid salt.

The addition of acid and the stirring is continued until a stiffly plastic mass results. This normally results when about two quarts of acid have been added to one pound 2.29 ounces of iron.

When the stiffly plastic stage of the mixture is reached, manganese dioxide is added. We prefer to use about 4.96 oz. manganese dioxide to the pound of iron, but different proportions, or other compounds containing manganese, may be used. The addition of the manganese dioxide results in the formation of readily soluble high acid phosphates of manganese, and the mixture becomes apparently wetter, and less stiffly plastic.

As a final step, sludge or "manferine", which will be described later, is stirred into the mixture until the whole becomes comparatively dry, so that it may be granulated or powdered. An amount of sludge or manferine equal to 5.84 oz. to each pound of iron is found satisfactory in a mixture such as described above. This is an amount of the dry sludge in weight equal to about one-twentieth the weight of the mixture to which the sludge is added. Considerable variation from the stated proportion of sludge is permissible.

In coating iron with a balanced solution, as described above, a sediment or deposit is formed which falls to the bottom of the treating tank. Where the process is continued for a considerable time, with the addition of fresh solution as the old solution depreciates in strength, a considerable quantity of this deposit or sludge accumulates. The composition of this sludge is very complex, and it is not deemed necessary to attempt an accurate statement of its chemical composition. Apparently it consists largely of slightly soluble or insoluble phosphates, such as form the rust proofing coating, and some more highly acid salts. Hereafter, where the term "sludge" is used, the deposit formed in the manner described in a rust-proofing tank is meant, and "manferine" is a term applied to this sludge where manganese is included in the rust proofing solution.

The sludge or "manferine", upon removal from the tank and drying, becomes a highly absorbent mass, and its use in the mixture accomplishes two purposes. In the first place, it dries out the mixture, so that it can be readily handled as a granular or powdered product. In the next place, it adds the elements necessary to balance the solution, so that a mixture of the material with water produces a solution ready for immediate use.

There is a tendency for the mixture to harden into a solid mass. This tendency is lessened by heating the phosphoric acid before allowing it to re-act with the iron, and therefore such heating is desirable, as stated above. Even when carefully formed, the granular mass has a tendency to cake upon standing. The caked product may be ground, and this ground material has comparatively little tendency to cake, and is advantageous in this respect over the freshly formed granules, where it is likely to stand for a considerable period before use.

The material produced as described is convenient to handle, and can be shipped more easily as well as more cheaply than phosphoric acid, which is usually shipped in carboys for use in rust-proofing.

Simple instructions enable anyone to mix the proper amount of material with water and produce a balanced solution ready to begin the coating operation. The proportion of the powdered or granular material to the water used may be varied considerably, but a weak solution is used. We have found the proportion of one ounce of the powder to two quarts of water fairly satisfactory. This material is particularly advantageous where a comparatively small amount of rust proofing is to be done, or where the rust proofing is done at intervals, in contrast to being a substantially continuous operation.

Where free acid is present in the coating solution, crystallized phosphates are apt to be formed as a part of the coating. These crystals are liable to admit moisture around them, so that a coating having the crystals, commonly referred to as "sparkle", is less efficient than a coating free from crystals. In the material prepared as described above, the phosphoric acid is so thoroughly combined with iron and manganese that "sparkle" is practically eliminated.

The manganese dioxide may be omitted, or other compounds substituted, and sludge may be used from a tank where manganese was not present in the solution, but we have found it easier to retain a satisfactory percentage of acid phosphates in solution where manganese is present, as the phosphates of manganese are more soluble than the corresponding phosphates of iron, and therefore we prefer to add manganese dioxide, as described above, and to employ manferine for the added sludge.

The high acid phosphates may be prepared as described above, either with or without the manganese dioxide, and the sludge omitted, in which case it is somewhat more difficult to prepare a satisfactorily dry mixture, although this may be done in various ways, as by reducing or omitting the MnO2, drying while stirring, using absorbent material other than sludge etc. Where desired, the mixture may be used in its moist condition. In starting the coating action, where a mixture without the sludge is used, the solution must be allowed to attack iron until enough sludge is formed to "balance" the solution before the most efficient coating can be done; but after the coating operation has been started, the material without sludge may be added to renew the solution, there being sufficient sludge present in the tank to balance the solution.

The material containing sludge may be used not only for starting the coating operation, but for renewing the solution, where this is most convenient. A good way, where convenient, is to use the balanced material to start the operation, and to renew the solution by adding the compound without sludge.

It will be readily understood that the specific description given above is given merely to enable those skilled in the art to understand how our invention may be practiced, and that, while some variations have been mentioned, no attempt has been made to describe all of the obvious variations in our invention, the scope of which is defined in the appended claims.

What we claim is:

1. The method of making a rust-proofing compound, which comprises stirring iron fragments while mixing therewith commercial phosphoric acid until the mixture becomes stiffly plastic, and thereafter adding an absorbent material until the mixture assumes a granular or powdery condition.

2. The method of making a rust-proofing compound, which comprises stirring iron fragments while mixing therewith commercial phosperic acid until the mixture becomes stiffly plastic, and thereafter adding sludge to the mixture.

3. The method of making a rust-proofing compound, which comprises stirring iron fragments while mixing therewith commercial phosporic acid until the mixture becomes stiffly plastic, and thereafter adding manferine to the mixture.

4. The method of making a rust-proofing compound, which comprises stirring iron fragments while mixing therewith commercial phosphoric acid until the mixture becomes stiffly plastic, thereafter stirring into the mixture manganese dioxide, and thereafter adding sludge in an amount substantially equal to 5.84 oz. for each pound of iron used.

5. The process of forming a rust-proofing compound, which comprises stirring iron fragments while slowly adding thereto an aproximately 65% solution of phosphoric acid until the amount of solution added is substantially in the proportion of two quarts to one pound 2.29 ounces of the iron used, thereafter stirring in manganese dioxide in substantially the proportion of 4.96 oz. to the pound of iron, and finally stirring in manferine to an amount substantially equal to 5.84 oz. for each pound of iron.

6. The method of making a rust-proofing compound, which comprises stirring iron fragments while mixing therewith hot commercial phosphoric acid until the mixture becomes stiffly plastic, and thereafter adding an absorbent material until the mixture assumes a granular or powdery condition.

7. The method of making a rust-proofing compound, which comprises stirring iron fragments while mixing therewith hot commercial phosphoric acid until the mass becomes stiffly plastic, then stirring a manganese compound into the mass, and thereafter adding a granular absorbent material until the entire mixture assumes an apparently dry granular condition.

8. The method of making a rust-proofing compound, which comprises stirring iron fragments while mixing therewith hot commercial phosphoric acid until the mass becomes stiffly plastic, then stirring a manganese compound into the mass, and thereafter adding a granular absorbent material until the entire mixture assumes an apparently dry granular condition, allowing the granular material to stand until it cakes, and finally grinding the caked mass.

9. A rust-proofing compound, comprising a granular or powdery substance containing high acid ortho-phosphates of iron and enough low acid and basic phosphates of iron so that, when the substance is mixed with water, a balanced solution is produced which will immediately begin coating iron immersed therein.

10. A rust-proofing compound, comprising a granular or powdery substance containing high acid phosphates of iron and manganese and low acid and basic phosphates of iron and manganese, the low acid and basic phosphates being, in the dry state, about one-twentieth by weight of the amount of the high acid phosphates.

11. The process of rust-proofing iron articles, which comprises mixing a granular or powdery substance containing high acid phosphates of iron and manganese and low acid and basic phosphates of iron and manganese with sufficient water to form a dilute solution, heating the solution, immersing iron articles in the solution, removing the articles as they become coated and adding other articles to be coated, and maintaining the strength of the solution by adding only high acid orthophosphates of iron and manganese.

12. The process of rust-proofing iron articles, which comprises immersing iron articles in a solution containing high acid phosphates of iron and manganese, maintaining the solution hot, removing the articles after they become coated and adding other articles to be coated, and maintaining the strength of the solution entirely by the addition of high acid phosphates of iron and manganese.

13. The process of rust-proofing iron articles, which comprises immersing iron articles in a solution containing high acid phosphates of iron, maintaining the solution hot, removing the articles as they become coated and adding other articles to be coated, and maintaining the strength of the solution by adding a granular or powdery material containing high acid ortho-phosphates of iron.

In testimony whereof, we have hereunto signed our names to this specification.

MATTHEW GREEN.
ELMER M. JONES.